United States Patent
Yaworski (10) Patent No.: US 9,543,062 B2
(45) Date of Patent: Jan. 10, 2017

(54) POSITIONING DEVICE FOR CABLE ACCESSORIES AND METHODS AND ASSEMBLIES INCLUDING SAME

(71) Applicant: Tyco Electronics Corporation, Berwyn, PA (US)

(72) Inventor: Harry Yaworski, Cary, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 152 days.

(21) Appl. No.: 14/683,739

(22) Filed: Apr. 10, 2015

(65) Prior Publication Data

US 2016/0300645 A1    Oct. 13, 2016

(51) Int. Cl.
*H01B 17/58* (2006.01)
*H01B 13/06* (2006.01)

(52) U.S. Cl.
CPC .............. *H01B 17/58* (2013.01); *H01B 13/06* (2013.01)

(58) Field of Classification Search
CPC ........... H01B 17/58; H01B 13/06; H01B 7/00; H01B 7/0009; H01B 7/04; H01B 11/00; H02G 15/00; H02G 15/007; H02G 15/04; H02G 15/18; H02G 15/1806; H02G 15/184; H02G 15/064
USPC .. 174/84 R, 68.1, 68.3, 93, 88 R, 74 R, 135; 248/68.1, 49
See application file for complete search history.

(56) References Cited

U.S. PATENT DOCUMENTS

| | | | | |
|---|---|---|---|---|
| 5,801,332 A | * | 9/1998 | Berger ................. | H02G 15/103 174/73.1 |
| 6,103,975 A | * | 8/2000 | Krabs .................. | H02G 15/103 174/74 A |
| 7,858,883 B2 | * | 12/2010 | Seraj .................. | H02G 15/1833 174/88 R |
| 7,863,521 B2 | * | 1/2011 | Campbell .......... | H02G 15/1826 174/93 |
| 8,030,570 B2 | * | 10/2011 | Seraj .................. | H02G 15/1833 174/93 |

(Continued)

OTHER PUBLICATIONS

Data Sheet for 3M™ Cold Shrink Silicone Rubber Termination Kit QT-III, 7620-S, 7680-S and 7690-S Series 5—3.45 kV, 3M Company, Aug. 2008, 11 pages.

(Continued)

*Primary Examiner* — Angel R Estrada
(74) *Attorney, Agent, or Firm* — Myers Bigel, P.A.

(57) ABSTRACT

A pre-expanded cover unit for an electrical cable includes a cold-shrinkable, tubular, elastomeric cover sleeve, a removable holdout, and a positioning device. The cover sleeve defines a cover sleeve through passage configured to receive the electrical cable. The holdout is mounted within the cover sleeve through passage and configured to be withdrawn therefrom. The holdout maintains the cover sleeve in an expanded state in which the cover sleeve is elastically expanded and, when withdrawn from the cover sleeve through passage, permits the cover sleeve to radially contract to a contracted state about the electrical cable. The positioning device is secured to the cover sleeve and includes a cable clamp. The cable clamp is configured to secure the positioning device to the electrical cable such that, when the holdout is withdrawn from the cover sleeve, the positioning device axially constrains the cover sleeve relative to the cable to axially align the contracted cover sleeve with the electrical cable.

21 Claims, 5 Drawing Sheets

(56) References Cited

U.S. PATENT DOCUMENTS 8,889,989 B2 * 11/2014 Maher .................. H02G 15/064
174/68.1

OTHER PUBLICATIONS

Instruction Sheet for 3M QT-III Cold Shrink™ Silicone Rubber Termination (With High-K Stress Relief), 3M Company, © 1996, 10 pages.
Assembly instructions for 38/12 Tubing on the 25kV Class Couplers, 2009, 9 pages.
Cold Shrink Medium Voltage Cable Terminations, Titan UD Series, DSG-CANUSA, Jul. 25, 2011, 2 pages.
Product Selection Guide for Cable Accessories Ranger2™ Terminations, Thomas & Betts Corporation, © 2007, 12 pages.
ElaspeedTM Medium Voltage Cold Shrink Terminations, Prysmian Power Cables and Systems, Mar. 24, 2011, 3 pages.
Raychem TFT-E Tool Free Termination, Tyco Electronics, © 2005, 2007, 2008-2011, 2 pages.

* cited by examiner

POSITIONING DEVICE FOR CABLE ACCESSORIES AND METHODS AND ASSEMBLIES INCLUDING SAME

FIELD OF THE INVENTION

The present invention relates to electrical cables and connections and, more particularly, to protective covers for electrical cables and connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

Also, electrical stress concentrations in cable terminations can cause degradation of cable insulation. To address this problem, terminations are commonly provided with stress control elements (e.g., a stress cone or high-K layer). However, in practice such terminations may be installed improperly in such a manner that the stress control element is rendered ineffective or less effective.

SUMMARY

According to embodiments of the invention, a pre-expanded cover unit for an electrical cable includes a cold-shrinkable, tubular, elastomeric cover sleeve, a removable holdout, and a positioning device. The cover sleeve defines a cover sleeve through passage configured to receive the electrical cable. The holdout is mounted within the cover sleeve through passage and configured to be withdrawn therefrom. The holdout maintains the cover sleeve in an expanded state in which the cover sleeve is elastically expanded and, when withdrawn from the cover sleeve through passage, permits the cover sleeve to radially contract to a contracted state about the electrical cable. The positioning device is secured to the cover sleeve and includes a cable clamp. The cable clamp is configured to secure the positioning device to the electrical cable such that, when the holdout is withdrawn from the cover sleeve, the positioning device axially constrains the cover sleeve relative to the cable to axially align the contracted cover sleeve with the electrical cable.

According to method embodiments of the invention, a method for installing a cover sleeve on an electrical cable includes providing: a cold-shrinkable, tubular, elastomeric cover sleeve defining a cover sleeve through passage configured to receive the electrical cable; a removable holdout mounted within the cover sleeve through passage and configured to be withdrawn therefrom, wherein the holdout maintains the cover sleeve in an expanded state in which the cover sleeve is elastically expanded and, when withdrawn from the cover sleeve through passage, permits the cover sleeve to radially contract to a contracted state about the electrical cable; and a positioning device secured to the cover sleeve and including a cable clamp. The method further includes: securing the positioning device to the electrical cable using the cable clamp; and withdrawing the holdout from the cover sleeve, wherein the positioning device axially constrains the cover sleeve relative to the cable to axially align the contracted cover sleeve with the electrical cable.

According to embodiments of the invention, a cover system for an electrical cable includes a cold-shrinkable, tubular, elastomeric cover sleeve, a removable holdout, and a positioning device. The cover sleeve defines a cover sleeve through passage configured to receive the electrical cable. The holdout is mounted within the cover sleeve through passage and configured to be withdrawn therefrom. The holdout maintains the cover sleeve in an expanded state in which the cover sleeve is elastically expanded and, when withdrawn from the cover sleeve through passage, permits the cover sleeve to radially contract to a contracted state about the electrical cable. The positioning device is configured to be secured to the cover sleeve and includes a cable clamp. The cable clamp is configured to secure the positioning device to the electrical cable such that, when the positioning device is secured to the cover sleeve and the holdout is withdrawn from the cover sleeve, the positioning device axially constrains the cover sleeve relative to the cable to axially align the contracted cover sleeve with the electrical cable.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

As used herein, "monolithic" means an object that is a single, unitary piece formed or composed of a material without joints or seams.

As used herein, "high-K material" means high electrical permittivity material.

Figure 1:
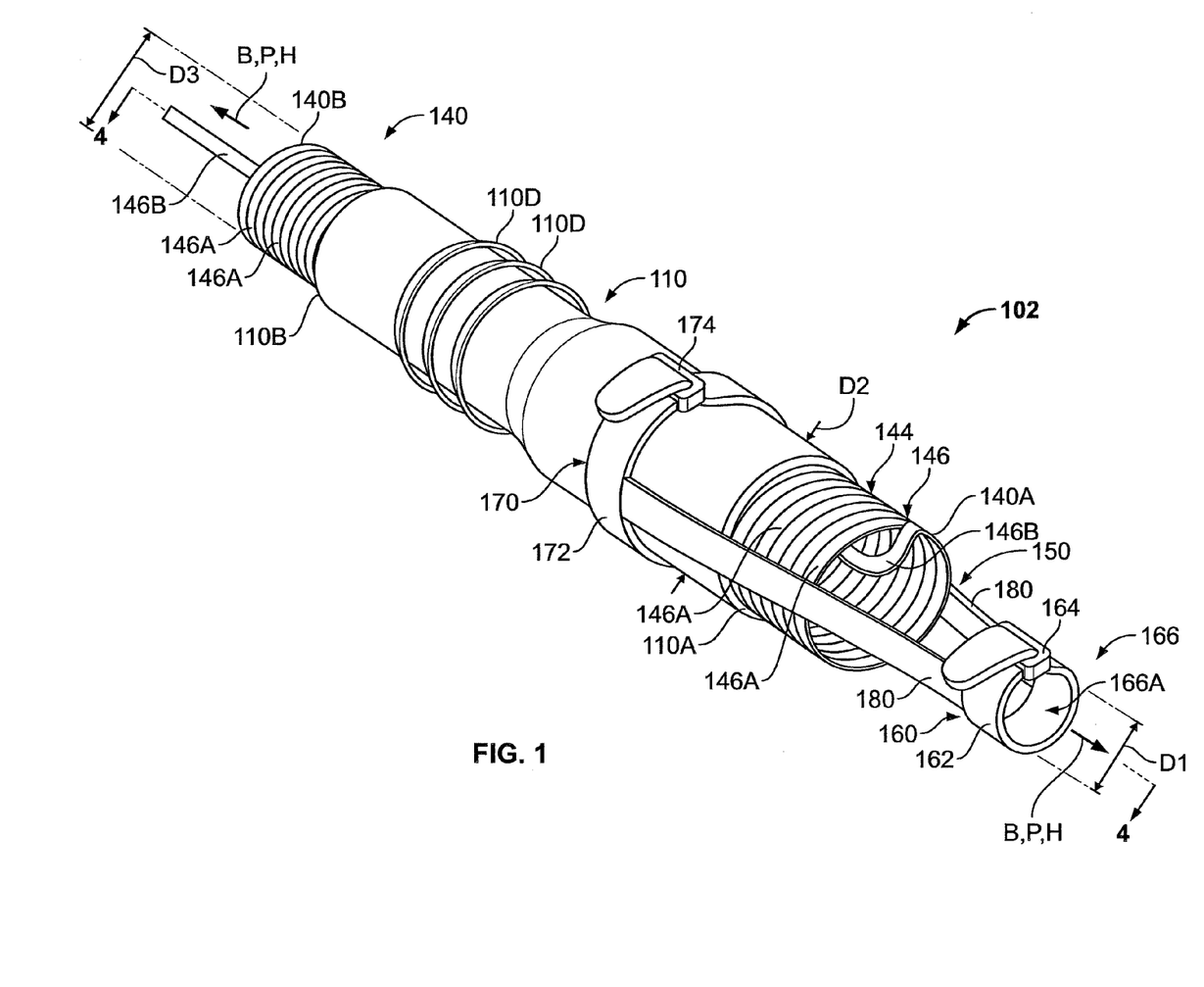
FIG. 1 is a rear perspective view of a pre-expanded cover unit according to embodiments of the invention.
Figure 2:
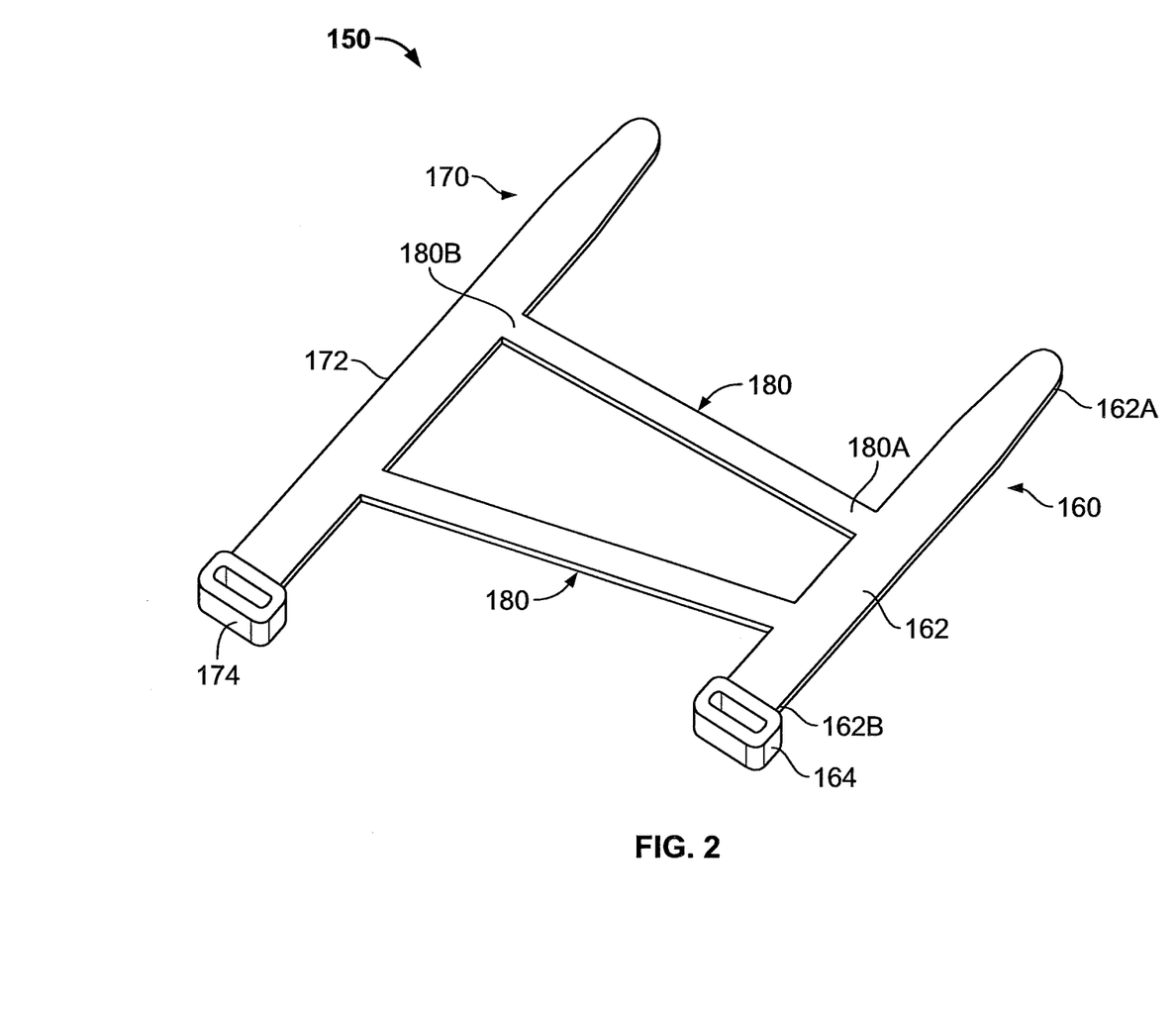
FIG. 2 is a rear perspective view of a positioning device forming a part of the pre-expanded cover unit of FIG. 1.
Figure 4:
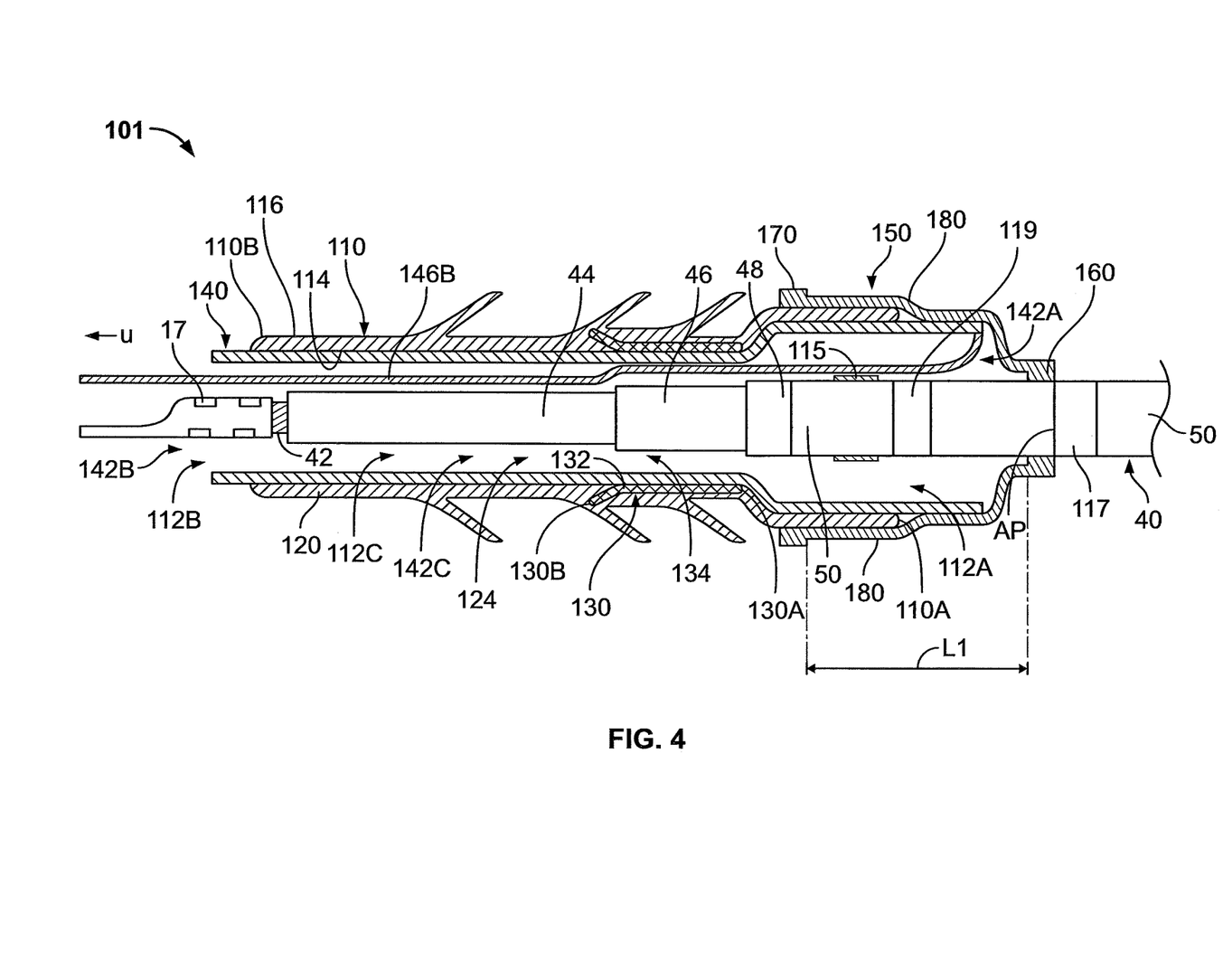
FIG. 4 is a side view of the pre-expanded cover unit of FIG. 1 secured to the cable of FIG. 3, wherein the pre-expanded cover unit is shown in cross-sectional view along the line 4-4 of FIG. 1.

With reference to FIGS. 1, 2, and 4, a cover system 101 according to some embodiments of the present invention is shown therein. In some embodiments, the cover system 101 includes a termination body or cover assembly, body or sleeve 110, a holdout 140, a positive positioning device 150, anchor locator tape 117, reference tape 119, and sealant 115. The cover system 101 may be used to form a protected cable assembly 15 including a terminated (or spliced) cable 40, a termination or connector 17, and the cover sleeve 110. In some embodiments, the cover system 101 or a portion thereof is provided as a pre-packaged kit of components for subsequent use and assembly by an installer (e.g., a field installer) using a method as described herein.

Figure 3:
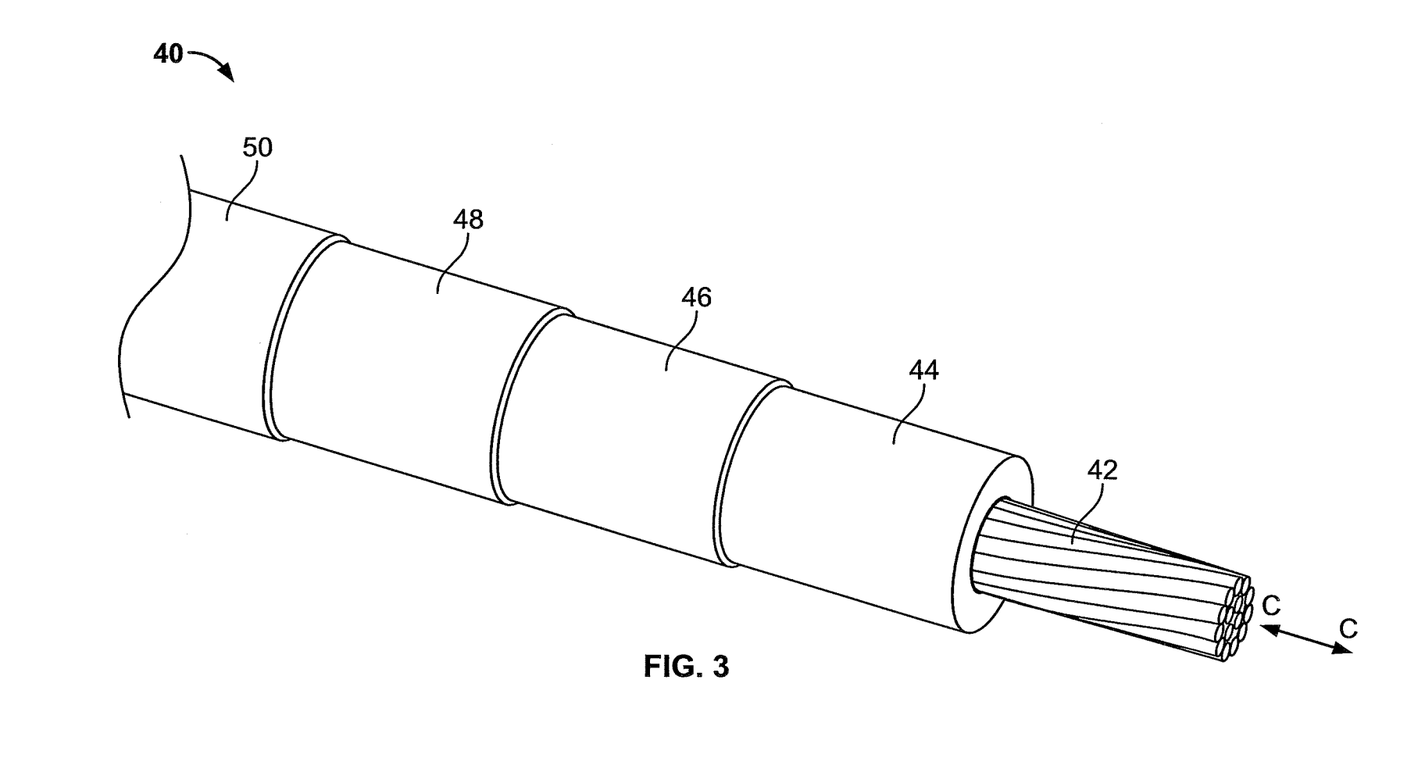
FIG. 3 is a perspective view of an exemplary cable for use with the pre-expanded cover unit of FIG. 1.

As shown in FIG. 3, the cable 40 includes a primary electrical conductor 42, a polymeric insulation layer 44, a semiconductor layer 46, a metal electromagnetic radiation shield layer 48, and a jacket 50, with each component being concentrically surrounded by the next. The cable 40 has a cable axis C-C.

According to some embodiments and as shown, the shield layer 48 includes a metal tape, foil, strip or sheath wrapped or wound (e.g., circumferentially or helically) about and fully circumferentially surrounding the semiconductor layer 46 along the length of the cable 40. In some embodiments, the shield layer 48 may include individual concentric neutral wires longitudinally or helically wound about the semiconductor layer 46 along the length of the cable 40 and about the axis C-C, for example.

The primary conductor 42 may be formed of any suitable electrically conductive materials such as copper (solid or stranded).

The polymeric insulation layer 44 may be formed of any suitable electrically insulative material such as crosslinked polyethylene (XLPE) or EPR.

The semiconductor layer 46 may be formed of any suitable semiconductor material such as carbon black with silicone. In some embodiments, the semiconductor layer has a thickness in the range of from about 0.030 to 0.070 inch.

The shield layer 48 may be formed of any suitable material such as copper.

The jacket 50 may be formed of any suitable material such as EPDM or PVC.

According to some embodiments, the cable 40 is a low-voltage or medium-voltage (e.g., between about 4 and 69 kV) power transmission cable. According to some embodiments, the cable 40 has a size (outer diameter) in the range of from about 0.6 to 4 inches.

In some embodiments and as illustrated, the cover sleeve 110, the holdout 140 and the positioning device 150 are provided as a pre-expanded cover unit 102. More particularly, the cover sleeve 110 is mounted on the holdout 140 in an expanded state or position, and the positioning device 150 is mounted on the cover sleeve 110 and the holdout 140, as shown in FIGS. 1 and 4.

According to some embodiments, the cover sleeve 110 is a cold shrink cover, meaning that it can be shrunk or retracted about the substrate(s) without requiring the use of applied heat.

The cover sleeve 110 includes an outer, electrically insulating sleeve or layer 120 and an integral electrically conductive (e.g., semiconductive) stress element layer or stress cone 130. The layers 120 and 13Q are thus formed of electrically and functionally dissimilar materials.

The cover sleeve 110 has opposed inner and outer surfaces 114 and 116, and opposed ends 110A, 110B. The cover sleeve 110 is tubular and defines an axially extending conductor through passage 112C that communicates with opposed end openings 112A, 112B and defines a cover sleeve axis B-B. The cover sleeve 110 may include integral sheds 110D.

The outer, electrically insulating layer 120 forms the outer surface 116 and has an opposed inner surface 122, and opposed ends at the ends 110A and 110B. The outer layer 120 is tubular and defines an axially extending conductor through passage 124 that communicates with the opposed end openings 112A, 112B.

The outer layer 120 can be formed of any suitable elastically expandable, dielectric or electrically insulative material. According to some embodiments, the outer layer 120 has a Modulus at 100 percent elongation (M100) in the range of from about 0.13 to 0.80 MPa. According to some embodiments, the outer layer 120 is formed of an elastomeric material. According to some embodiments, the outer layer 120 is formed of ethylene propylene diene monomer (EPDM), liquid silicone rubber (LSR), ethylene propylene rubber (EPR), neoprene, silicone rubber, or other suitable rubber.

The stress cone layer 130 is a generally tubular sleeve bonded to the inner surface 122 of the outer layer 12Q in a midsection thereof. The outer layer 120 and the stress cone layer 130 collectively form a unitary structure. The stress cone extends axially from an end 130A to an end 130B.

The inner surface 132 of the stress cone layer 130 defines an axially extending conductor through passage 134 that defines, in part, the passage 112C.

The stress cone layer 130 may be formed of a suitable electrically conductive, elastically expandable material. According to some embodiments, the stress cone layer 130 is formed of a material having a Modulus at 100 percent elongation (M100) in the range of from about 0.15 to 0.90 MPa. According to some embodiments, the stress cone layer 130 is formed of an elastomeric material. According to some embodiments, the stress cone layer 130 is formed of liquid silicone rubber (LSR), EPDM, or ethylene propylene rubber (EPR). The elastomeric material may include an electrically conductive filler material such as carbon black, for example.

While a stress cone 13Q is shown and described above for the stress control element, other types of stress control elements may be provided in place of the stress cone. In some embodiments, the stress control element is an elastomeric high-K material (i.e., high relative permittivity material) likewise tubular in shape and forming an inner surface of the cover sleeve 110. The stress control element (e.g., stress cone or high-K tube) may have a different shape than illustrated in FIG. 3.

When the cover sleeve 110 is properly installed on the cable 40, the stress control element 130 (e.g., a stress cone or high-K layer) serves to smooth the abrupt change in the electrical field that can cause electrical stress at the terminal edge 46A of the cable semiconductor layer 46. Such electrical stress, if not addressed by a stress control element, may cause the insulation of the cable 40 to breakdown. When a stress cone shaped as shown in FIG. 4 is used, the shape of the stress cone can help taper the electrical field lines by forcing them to follow the contour of the stress cone.

The cover sleeve 110 may be formed by any suitable method and apparatus. According to some embodiments, the stress cone layer 130 is molded and the outer layer 120 is thereafter inserted over molded about the stress cone layer 130. According to some embodiments, the outer layer 120 and the stress cone layer 130 are each monolithic.

The holdout 140 is a disintegratable or collapsible rigid tube. According to some embodiments, the holdout 140 is what is commonly referred to as a spiral holdout or core.

The holdout 140 includes a tubular, cylindrical member or body 144. The holdout body 140 has a longitudinal axis H-H and opposed ends 140A, 140B. The holdout body 144 has an inner surface defining a through passage or bore 142C communicating with opposed end openings 142A, 142B. The illustrated holdout 140 is a bell-shaped holdout; however other shapes (e.g., uniform diameter) may be used.

The holdout 140 includes a continuous, flexible ribbon or strip 146 helically wound to form a series of looped strip segments 146A. The segments 146A are releasably or detachably joined to the respective adjacent segments 146A along their edges to thereby form or constitute the body 144 in the form of a rigid, tubular cylinder. For example, the segments 146A may be joined by continuously interlocked integral tongue and groove features, fusing or welding, or a continuous helical score or tear line. Examples of suitable holdouts may include holdouts as disclosed in U.S. Pat. No. 5,925,427 to Sadlo et al., U.S. Pat. No. 5,944,929 to Vallauri et al. and U.S. Pat. No. 5,670,223 to Sadlo et al.

The strip 146 further includes a pull cord or rip cord segment 146B that is routed to extend through the passage 142C as illustrated, for example. The rip cord 146B is a continuation of the portions of the strip 146 forming the body 144. In use, the rip cord 146B can be pulled in a direction U, thereby consecutively stripping the endmost strip segment 146A from the end 140A, whereupon the stripped segment 146A becomes a part of the rip cord 146B. In this way, the holdout body 144 can be unraveled and collapsed.

The holdout 140 can be formed of any suitable material. According to some embodiments, the holdout 140 is formed of a semi-rigid polymeric material. According to some embodiments, the holdout 140 is formed of high density polyethylene (HDPE), low density polyethylene (LDPE), polypropylene, ABS, or PVC.

When mounted on the holdout 140, the cover sleeve 110 is maintained in an elastically radially expanded state or position. According to some embodiment, in the expanded state the cover sleeve 110 is expanded in the range of from about 200 to 400 percent of its relaxed diameter (i.e., not on a substrate). As a result, the cover sleeve 110 of the pre-expanded unit 102 will exert a radially compressive pressure or load on the holdout 140.

The sealant 115 may be a mass of any suitable sealant. According to some embodiments, the sealant 115 is a flowable, conformable medium. According to some embodiments, the sealant is a mastic and, in some embodiments, a conformable, flowable, electrically insulative mastic. In some embodiments, the mastic is a rubber-based mastic. Examples of suitable mastics may include S1278 butyl rubber mastic available from TE Connectivity. Hereinbelow, the sealant 115 is referred to as a mastic. However, it will be appreciated that in other embodiments, the sealant 115 can be other types of sealant than mastic. In some embodiments, the sealant 115 is not used.

The tapes 117, 119 may be self-adhesive vinyl tapes, for example.

The positioning device 150 (FIGS. 1 and 2) has a lengthwise axis P-P. The positioning device 150 includes a first coupling or retention member in the form of a rear or cable circumferential clamp 160, a second coupling or retention member in the form of a front or cover sleeve circumferential clamp 170, and a pair of circumferentially opposed, axially extending connecting straps 180.

The cable clamp 160 is configured or configurable to form an endless circumferential band having an adjustable inner diameter D1 (FIG. 1). According to some embodiments and as illustrated, the clamp 160 is a cable tie, zip tie or tie-wrap including a flexible band 162 (having opposed ends 162A, 162B) and an adjustable locking mechanism 164. For example, the locking mechanism 164 may include a pawl head that cooperatively engages teeth on the band 162 to ratchet the band 162 into a reduced loop diameter as the band 162 is pulled through the mechanism 164 to adjust the length of a loop formed by the band 162. The band 162 may be pre-installed in the adjustment mechanism 164 to form an endless band or closed loop 166, or may be installed in the adjustment mechanism 164 on site or after the band 162 is wrapped around the cable 40. The closed loop 166 defines a through passage 166A.

The cover sleeve clamp 170 includes a band 172 and an adjustable locking mechanism 174 and may be constructed and operated in the same manner as described for the clamp 160. The clamp 170 has an adjustable inner diameter D2 (FIG. 1).

The clamps 160, 170 may be formed of any suitable material(s). In some embodiments, the clamps 160, 170 are formed of a polymeric material and, in some embodiments, nylon.

In some embodiments, other circumferential clamping devices may be used in place of the circumferential clamps 160, 170. Other suitable circumferential clamping devices may include metal or polymeric hose clamps.

The straps 180 each have a first end 180A and a second end 180B. The first end 180A of each strap 180 is secured or affixed to the cable clamp 160, and the second end 180B of each strap 180 is secured or affixed to the cover sleeve clamp 170. The strap ends 180A, 180B may be secured to the clamps 160, 170 by any suitable technique. In some embodiments and as illustrated in FIG. 2, the straps 180 are integrally molded with the clamps 160, 170. In some embodiments, the straps 180 and clamps 160, 170 collectively form a monolithic member. In some embodiments, the strap ends 180A, 180B are molded or welded to the clamps 160, 170. In other embodiments, the strap ends 180A, 180B are secured to the clamps 160, 170 by adhesive or fasteners. The straps 180 extend generally parallel to one another and the axis P-P.

The straps 180 may be formed of any suitable material(s). In some embodiments, the straps 180 are formed of a polymeric material and, in some embodiments, nylon. The straps 180 should be formed of a substantially non-elastic, stretch resistant material. According to some embodiments, the straps 180 are formed of a material having an elastic modulus of at least 2 MPa.

The initial or "open" inner diameter D1 of the clamp loop 166 is greater than the outer diameter of the cable 40, and any other cables within the range of cable sizes with which the positioning device 150 is intended for use. According to some embodiments, the initial diameter D1 is in the range of from about 1.5 to 6 inches.

Each strap 180 has a fixed length so that, when the straps 180 are fully extended, the clamps 160, 170 are spaced apart a prescribed clamp spacing or separation distance L1 (FIG. 4). According to some embodiments, the distance L1 is in the range of from about 3 to 8 inches.

The pre-expanded unit 102 may be assembled as follows. In some embodiments, the holdout device 140 and the positioning device 150 are installed on the cover sleeve 110 at a factory. In some embodiments, the cover sleeve 110 is formed and thereafter expanded, placed about the holdout 140 and permitted to contract onto the holdout 140. The cover sleeve clamp 170 of the positioning device 150 is then placed around the cover sleeve 110 adjacent the end 110A and circumferentially reduced or tightened about the cover sleeve 110. Using the adjustable locking mechanism 174, the clamp 170 is tightened onto the cover sleeve 110 and the holdout 140 to a degree sufficient to prevent nondeliberate or unintended axial displacement between the cover sleeve 110 and the clamp 170 (until the holdout 140 is withdrawn or collapsed as described below). That is, the clamp 170 radially and compressively loads (and in some embodiments, compresses) the cover sleeve 110 against the holdout 140, thereby securely clamping the positioning device 150 (and, in particular, the strap ends 180B) in position on the cover sleeve 110.

The holdout 140 retains the cover sleeve 110 in an elastically, radially expanded state. When the cover sleeve 110 is on the holdout 140.

The protected cable assembly 15 may be formed and the cover sleeve 110 may be installed as follows.

Figure 5:
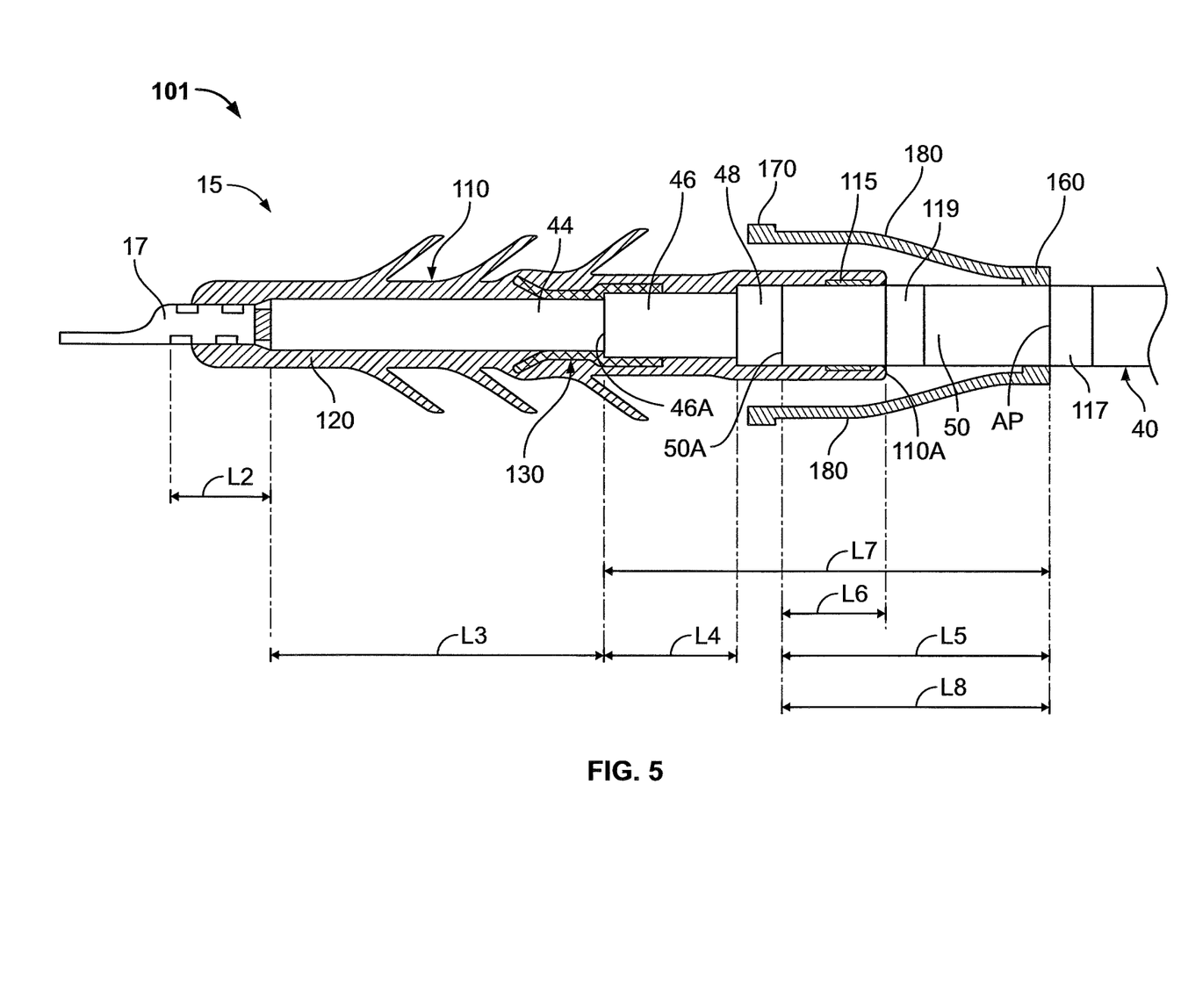
FIG. 5 is a side view of the pre-expanded cover unit of FIG. 1 after a holdout forming a part of the pre-expanded cover unit has been withdrawn and a cover sleeve of the pre-expanded cover unit has been mounted on the cable, wherein the positioning device, the cover sleeve, and sealant are shown in cross-sectional view along the line 4-4 of FIG. 1.

The cable is 40 prepared as shown in FIG. 4 such that a segment of each cable layer extends beyond the next overlying layer. More particularly, the insulation layer 44 is cut back axially to expose a terminal portion of the conductor 42 having a length L2 (FIG. 5). The semiconductor layer 46 is cut back axially to expose a portion of the insulation 44 having a length L3 (FIG. 5). The jacket 50 is cut back axially to expose a portion of the semiconductor layer 46 having a length L4 (FIG. 5).

The anchor locator tape 117 is placed or formed on the jacket 50 at a distance L5 (FIG. 5) from the terminal end 50A of the jacket. Optionally, the reference tape 119 is mounted on the jacket 50 at a distance L6 from the terminal end 50A of the jacket.

As will be appreciated from the description herein, the lengths of the cutbacks on the cable 40 will determine the relative positions of the cable layers with respect to the cover sleeve 110. In particular, the values of the lengths and distances L2-L6 will be a function of the distances L7 and L8 of the terminal edges 46A and 50A, respectively, of the layers 46 and 50 from a base, reference or anchor point AP (FIG. 5) along the length of the cable 40. Therefore, according to some embodiments, the values of the lengths and distances L2-L6 are prescribed for a given pre-expanded unit 102. The pre-expanded unit 102 may be provided to the installer with an instruction manual or reference document (e.g., look up table) listing the prescribed lengths and distances L2-L6. In some embodiments, the set of prescribed lengths and distances L2-L6 will vary depending on (and as a function of or based on) the diameter of the cable upon which the cover sleeve 110 is being installed.

The connector 17 or other termination is mounted on the terminal end of the conductor 42.

A layer of the mastic 115 is wrapped about the jacket 50 adjacent the terminal end of the jacket 50.

As discussed above, the cover sleeve clamp 170 is preclamped to the cover sleeve 110 in the pre-expanded cover unit 102. The pre-expanded cover unit 102 is slid over the cable 40 until the rear clamp 160 is proximate the tape 117 and the anchor point AP (which is visually indicated or designated by the tape 117). The inside diameters D1 and D3 (FIG. 1) of the positioning device 150 and the holdout 140 are greater than the outer diameter of the cable 40 so that the positioning device 150 and the holdout 140 can be slid onto the cable 40 without undue effort.

The cable clamp 160 is then tightened to securely clamp the cable clamp 160 onto the cable jacket 50 at the anchor point AP, adjacent the positioning marker 117. The position of the cover sleeve 110 is thereby fixed or limited relative to the cable 40 and the terminal edge 46A of the semiconductor layer 46.

The installer then pulls the cover sleeve 110/holdout 140 assembly axially away from the clamp 160 to draw the straps 180 tight, thereby spacing the clamps 160 and 170 apart the prescribed distance L1. With the straps 180 held in tension in this manner, the holdout 140 is then removed from the cover sleeve 110, thereby permitting the cover sleeve 110 (i.e., the elastomeric layers 120, 130) to relax and radially retract about the cable 40. The spirally wound holdout 140 is removed from the cover sleeve 110 by pulling the draw cord or section 146B from the end 140A (i.e., the end proximate the clamp 160) back through the holdout inner passage 142C in the direction U away from the clamp 160, to thereby incrementally, progressively unravel the holdout 140 (i.e., sequentially unravel each leading segment 146A of the strip 146 in a direction from end 140A to 140B) in known manner. In this way, the holdout 140 is axially progressively disintegrated or collapsed and the cover sleeve 110 is permitted to axially progressively elastically radially contract onto the cable 40 from end 110A to end 110B. In this manner, the cover sleeve 110 is cold-applied and cold shrunk onto the cable 40.

As will be appreciated from the figures and the foregoing description, the positioning device 150 (and, in particular, the location of the cable clamp 160 at the anchor point AP) will constrain the cover sleeve 110 and positively determine the axial location on the cable 40 at which the rear terminal edge 110E of the cover sleeve 110 contracts. As the cover sleeve 110 is released and further contracts onto the cable 40, the cover sleeve 110 grips the cable so as to prevent axial displacement between the cover sleeve 110 and the cable 4Q. That is, the relative axial position of the cover sleeve 110 on the cable 40 is effectively fixed.

When the holdout 140 is withdrawn (unravelled) beyond the cover sleeve clamp 170, the cover sleeve 110 shrinks away (i.e., radially contracts) from the cover sleeve clamp 170 and the cover sleeve clamp 170 is thereby automatically released from the cover member 110 and the holdout 140, and the cover sleeve 110 is thus freed from the positioning device 150. The cable clamp 160 can be cut or otherwise disconnected from the cable 40 and the installer can then fully remove the positioning device 150 from the installation.

The relaxed inner diameter of the cover sleeve 110 is less than at least the outer diameter of the jacket layer 50 and the outer diameter of the semiconductor layer 46. Therefore, the cover sleeve 110 exerts a persistent radially inwardly compressive or clamping force or pressure (due to elastic tension) onto the cable 40. The cover sleeve 110 may thereby effect a liquid tight seal at the interface between the cable 40 and the cover sleeve 110. This seal can protect the cable and the connection from the ingress of environmental moisture. According to some embodiments, the relaxed inner diameter of the cover sleeve 110 is between about 20 and 40 percent less than the smallest diameter cable upon which the cover sleeve 110 is intended to be installed.

In this manner, the positioning device 150 ensures that the cover sleeve 110 is properly axially aligned with the cable 40. In particular, the positioning device 150 and method of installation using the positioning device 150 ensure proper or prescribed axial alignment between the stress control element 130 (e.g., stress cone or high-K stress control layer) and the terminal edge 46A of the semiconductor layer 46. The stress control element 130 overlaps each of the semiconductor layer 46 and the insulation layer 44. The stress control element 130 bridges or circumferentially surrounds the transition or interface between the terminal edge 46A and the exposed insulation layer 44, and is thus well positioned to provide electrical stress control at this transition location.

According to some embodiments, the stress control element 130 axially overlaps each of the cable semiconductor layer 46 and the insulation layer 44 by at least 0.25 inch. According to some embodiments, the terminal edge 46A of the cable semiconductor layer 46 is located within 75 percent of the axial center point of the stress control layer 130.

While anchor locating tape 117 is illustrated in the figures and described above, other types of indicia may be used to mark the location for securing the cable clamp 160. For example, an ink or paint mark may be applied in place of the tape 117. Likewise, the reference tape 119 may be replaced with another type of indicia such as an ink or paint mark. Moreover, the indicia 119 serves only to confirm that the terminal edge 110A of the cover sleeve 110 has assumed its proper axial installed position relative to the cable 40, and may be omitted.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A pre-expanded cover unit for an electrical cable, the pre-expanded cover unit comprising:
   a cold-shrinkable, tubular, elastomeric cover sleeve defining a cover sleeve through passage configured to receive the electrical cable;
   a removable holdout mounted within the cover sleeve through passage and configured to be withdrawn therefrom, wherein the holdout maintains the cover sleeve in an expanded state in which the cover sleeve is elastically expanded and, when withdrawn from the cover sleeve through passage, permits the cover sleeve to radially contract to a contracted state about the electrical cable; and
   a positioning device secured to the cover sleeve and including a cable clamp;
   wherein the cable clamp is configured to secure the positioning device to the electrical cable such that, when the holdout is withdrawn from the cover sleeve, the positioning device axially constrains the cover sleeve relative to the cable to axially align the contracted cover sleeve with the electrical cable.

2. The pre-expanded cover unit of claim 1 wherein:
   the positioning device has axially opposed proximal and distal ends;
   the proximal end of the positioning device is affixed to the cover sleeve; and
   the cable clamp is located at the distal end.

3. The pre-expanded cover unit of claim 1 wherein the positioning device includes a cover sleeve clamp surrounding the cover sleeve such that the cover sleeve is captured between the cover sleeve clamp and the holdout.

4. The pre-expanded cover unit of claim 3 wherein the pre-expanded cover unit is configured to automatically release the cover sleeve from the cover sleeve clamp when the holdout is removed from the cover sleeve.

5. The pre-expanded cover unit of claim 1 wherein the cable clamp is adjustable.

6. The pre-expanded cover unit of claim 1 wherein the cable clamp includes a flexible cable tie.

7. The pre-expanded cover unit of claim 1 wherein the positioning device is formed of a polymeric material.

8. The pre-expanded cover unit of claim 1 wherein the positioning device includes:
   a cover sleeve clamp surrounding the cover sleeve such that the cover sleeve is captured between the cover sleeve clamp and the holdout;
   a connecting strap connecting the cover sleeve clamp to the cable clamp;
   wherein the cover sleeve clamp, the cable clamp, and the connecting strap are unitarily formed of a polymeric material.

9. The pre-expanded cover unit of claim 1 wherein the holdout is configured to be removed from the through passage by disintegrating and/or collapsing the holdout within the cover sleeve.

10. The pre-expanded cover unit of claim 9 wherein the holdout includes a strip helically wound to form a rigid tube, and the holdout is configured to be removed from the through passage by axially progressively unraveling the helically wound strip, which permits the cover sleeve to axially progressively radially contract about the electrical cable.

11. The pre-expanded cover unit of claim 1 wherein the cover sleeve includes:
   an integral, electrically conductive, tubular stress control layer; and
   an electrically insulating, tubular outer layer integral with and surrounding the stress control layer;
   wherein the stress control layer and the outer layer each define a portion of the through passage.

12. The pre-expanded cover unit of claim 11 wherein the stress control layer includes a stress control cone or a layer of high-K material.

13. The pre-expanded cover unit of claim 11 wherein:
   the electrical cable includes:
      an exposed section of a cable insulation layer; and
      an exposed section of a semiconductor layer surrounding the cable insulation layer and having a terminal edge at the exposed section of the cable insulation layer; and
   the pre-expanded cover unit is configured such that when the positioning device is secured to the electrical cable using the cable clamp at a prescribed anchor point and the holdout is withdrawn from the cover sleeve, the stress control element axially overlaps and circumferentially surrounds the terminal edge of the exposed section of the semiconductor layer and adjacent portions of the exposed section of the cable insulation layer and the exposed section of the semiconductor layer.

14. A method for installing a cover sleeve on an electrical cable, the method comprising the steps of:
   providing:
      a cold-shrinkable, tubular, elastomeric cover sleeve defining a cover sleeve through passage configured to receive the electrical cable;
      a removable holdout mounted within the cover sleeve through passage and configured to be withdrawn therefrom, wherein the holdout maintains the cover sleeve in an expanded state in which the cover sleeve is elastically expanded and, when withdrawn from the cover sleeve through passage, permits the cover sleeve to radially contract to a contracted state about the electrical cable; and
      a positioning device secured to the cover sleeve and including a cable clamp;
   securing the positioning device to the electrical cable using the cable clamp; and
   withdrawing the holdout from the cover sleeve, wherein the positioning device axially constrains the cover sleeve relative to the cable to axially align the contracted cover sleeve with the electrical cable.

15. The method of claim 14 wherein:
   the positioning device includes a cover sleeve clamp surrounding the cover sleeve such that the cover sleeve is captured between the cover sleeve clamp and the holdout; and
   the cover sleeve is automatically released from the cover sleeve clamp when the holdout is removed from the cover sleeve.

16. The method of claim 14 wherein securing the positioning device to the electrical cable includes adjustably tightening the cable clamp onto the electrical cable.

17. The method of claim 14 wherein withdrawing the holdout from the cover sleeve includes disintegrating and/or collapsing the holdout within the cover sleeve.

18. The method of claim 14 wherein the cover sleeve includes:
   an integral, electrically conductive, tubular stress control layer; and
   an electrically insulating, tubular outer layer integral with and surrounding the stress control layer;
   wherein the stress control layer and the outer layer each define a portion of the through passage.

19. The method of claim 18 wherein:
   the electrical cable includes:
      an exposed section of a cable insulation layer; and
      an exposed section of a semiconductor layer surrounding the cable insulation layer and having a terminal edge at the exposed section of the cable insulation layer; and
   the method includes securing the positioning device to the electrical cable at a prescribed anchor point using the cable clamp; and
   after the holdout is withdrawn from the cover sleeve, the stress control element axially overlaps and circumferentially surrounds the terminal edge of the exposed section of the semiconductor layer and adjacent portions of the exposed section of the cable insulation layer and the exposed section of the semiconductor layer.

20. The method of claim 14 including providing the holdout, the cover sleeve mounted on the holdout in the expanded state, and the positioning device secured to the cover sleeve as a preassembled pre-expanded cover unit prior to the step of securing the positioning device to the electrical cable using the cable clamp.

21. A cover system for an electrical cable, the cover system comprising:
   a cold-shrinkable, tubular, elastomeric cover sleeve defining a cover sleeve through passage configured to receive the electrical cable;
   a removable holdout mounted within the cover sleeve through passage and configured to be withdrawn therefrom, wherein the holdout maintains the cover sleeve in an expanded state in which the cover sleeve is elastically expanded and, when withdrawn from the cover sleeve through passage, permits the cover sleeve to radially contract to a contracted state about the electrical cable; and a positioning device configured to be secured to the cover sleeve and including a cable clamp;

wherein the cable clamp is configured to secure the positioning device to the electrical cable such that, when the positioning device is secured to the cover sleeve and the holdout is withdrawn from the cover sleeve, the positioning device axially constrains the cover sleeve relative to the cable to axially align the contracted cover sleeve with the electrical cable.

* * * * *

UNITED STATES PATENT AND TRADEMARK OFFICE
CERTIFICATE OF CORRECTION

PATENT NO. : 9,543,062 B2  
APPLICATION NO. : 14/683739  
DATED : January 10, 2017  
INVENTOR(S) : Harry Yaworski Page 1 of 1

It is certified that error appears in the above-identified patent and that said Letters Patent is hereby corrected as shown below:

In the Specification

Column 4, Line 59: Please correct "13Q" to read -- 130 --

Column 5, Line 19: Please correct "12Q" to read -- 120 --

Column 5, Line 37: Please correct "13Q" to read -- 130 --

Signed and Sealed this  
Eighteenth Day of July, 2017

Joseph Matal  
*Performing the Functions and Duties of the  
Under Secretary of Commerce for Intellectual Property and  
Director of the United States Patent and Trademark Office*